(12) United States Patent
Bach et al.

(10) Patent No.: US 10,555,178 B1
(45) Date of Patent: Feb. 4, 2020

(54) WIRELESS COMMUNICATION NETWORK-BASED DETECTION OF GPS SPOOFING

(71) Applicant: International Business Machines Corporation, Armonk, NY (US)

(72) Inventors: Dave Bach, Phoenix, AZ (US); Nicholas Fragiskatos, Tucson, AZ (US); John A. Rohe, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/183,168

(22) Filed: Nov. 7, 2018

(51) Int. Cl.
| H04W 4/00 | (2018.01) |
| H04W 12/12 | (2009.01) |
| H04W 4/02 | (2018.01) |

(52) U.S. Cl.
CPC ........... *H04W 12/12* (2013.01); *H04W 4/023* (2013.01); *H04W 4/025* (2013.01)

(58) Field of Classification Search
CPC ...... H04W 12/12; H04W 4/023; H04W 4/025
See application file for complete search history.

(56) References Cited

U.S. PATENT DOCUMENTS

| 8,922,427 B2 | 12/2014 | Dehnie et al. | |
| 2011/0207477 A1* | 8/2011 | Siomina | G01S 5/0278 455/456.2 |
| 2013/0002477 A1 | 1/2013 | Dehnie et al. | |
| 2015/0065166 A1 | 3/2015 | Ward et al. | |
| 2015/0226858 A1 | 8/2015 | Leibner et al. | |
| 2016/0084936 A1* | 3/2016 | Smith | H04W 4/029 455/456.1 |

FOREIGN PATENT DOCUMENTS

EP 2792021 B1 2/2017

\* cited by examiner

*Primary Examiner* — Pakee Fang
(74) *Attorney, Agent, or Firm* — Cantor Colburn LLP; William Kinnaman

(57) ABSTRACT

Methods, systems and computer program products for using wireless communication networks to detect GPS spoofing are provided. Aspects include receiving, from each mobile device of a plurality of mobile devices, location data of the mobile device and a list of wireless communication networks indicated as being detected by the mobile device. Aspects also include selecting a test group of mobile devices including a group of at least two mobile devices that are located within a predetermined proximity to a candidate mobile device. Aspects also include determining a degree of similarity of wireless communication network visibility based on a comparison of the lists of wireless communication networks indicated as being detected by the candidate mobile device and the test group of mobile devices. In response to the degree of similarity failing to exceed a predetermined threshold, aspects also include determining that the candidate mobile device is spoofing its location.

17 Claims, 6 Drawing Sheets

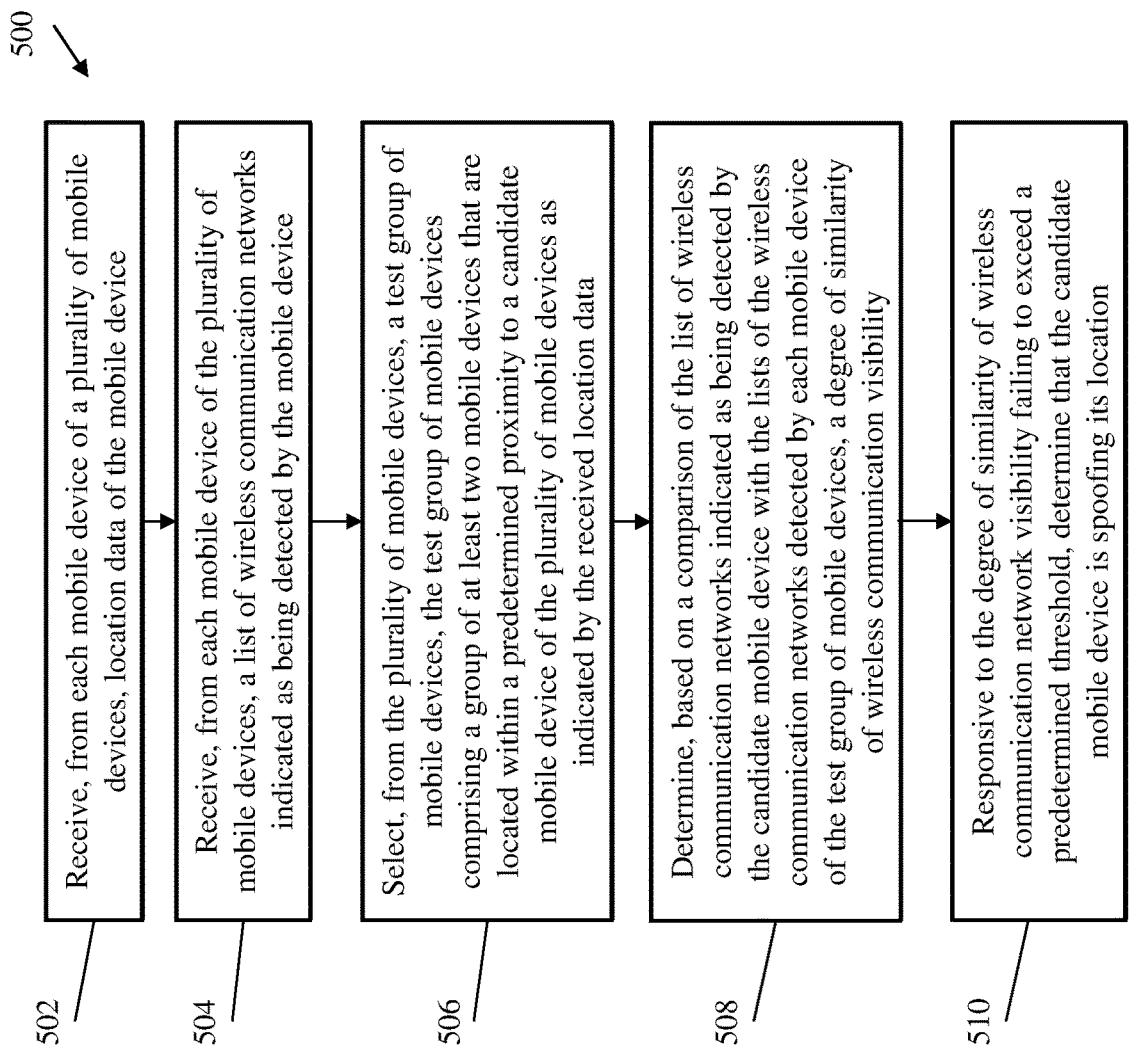

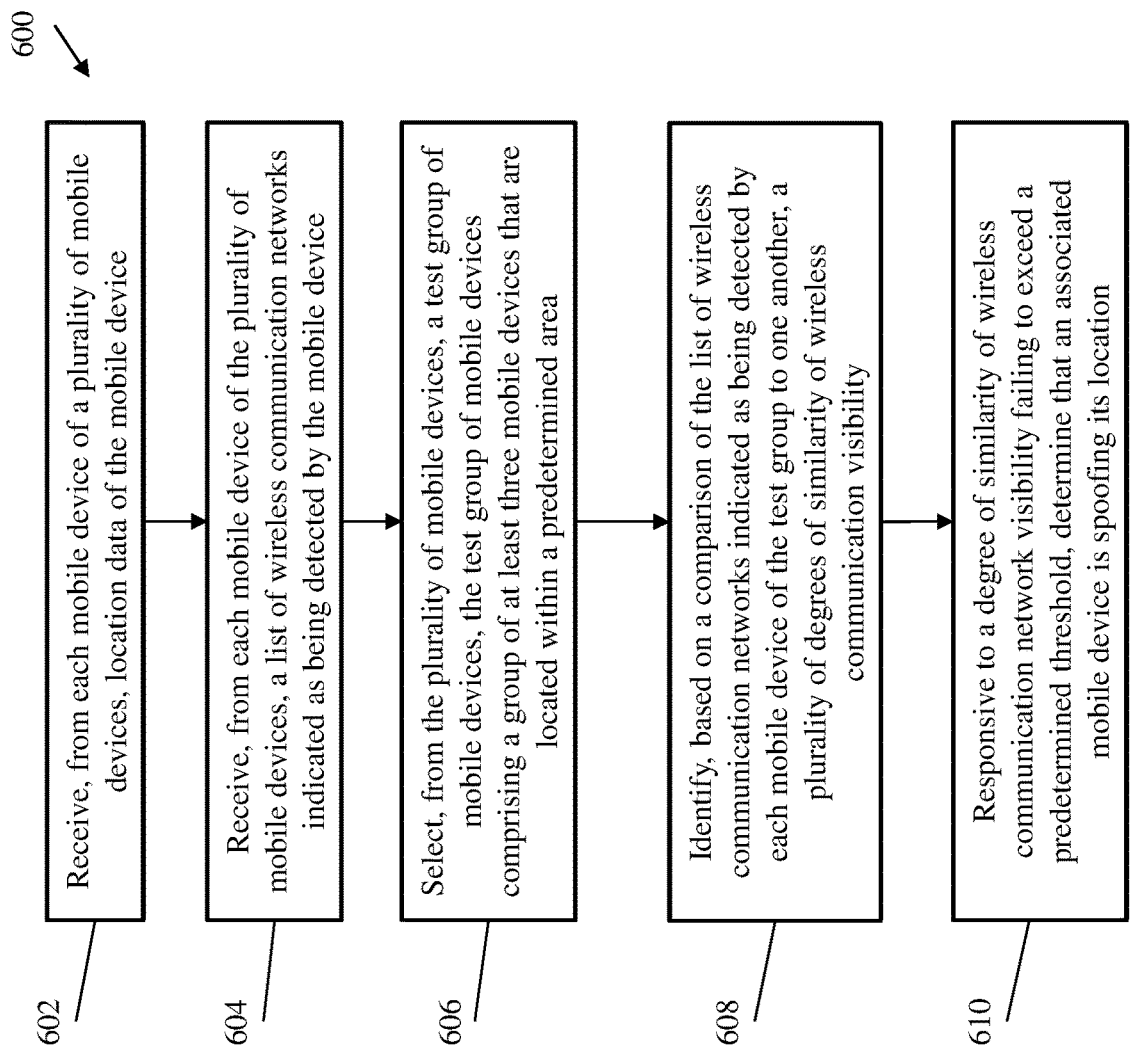

WIRELESS COMMUNICATION NETWORK-BASED DETECTION OF GPS SPOOFING

BACKGROUND

The present invention generally relates to detection of location spoofing, and more specifically, to using wireless communication networks to detect global positioning system (GPS) spoofing.

Mobile device, such as smartphones, commonly include location sensors, such as GPS sensors that can detect the longitude and latitude of the device to determine its location. Organizations such as merchants can offer location-based services to users of such devices through mobile applications, websites or the like. For example, a merchant may provide a user that is within a certain proximity of a store with a discount offer for a product at the store. Similarly, augmented reality applications and location-based games may similarly use a mobile device's location to provide other application or game functionalities to users based on their location. However, it may be possible for some users to spoof the GPS data of their device to create the impression that the user is at a location that the user is not really at, thereby potentially providing the user with unfair or fraudulent access to such merchant offers, application and/or gaming functionalities.

SUMMARY

Embodiments of the present invention are directed to a computer-implemented method for using wireless communication networks to detect GPS spoofing. A non-limiting example of the computer-implemented method includes receiving, from each mobile device of a plurality of mobile devices, location data of the mobile device. The method also includes receiving, from each mobile device of the plurality of mobile devices, a list of wireless communication networks indicated as being detected by the mobile device. The method also includes selecting, from the plurality of mobile devices, a test group of mobile devices. The test group of mobile devices can include a group of at least two mobile devices that are located within a predetermined proximity to a candidate mobile device of the plurality of mobile devices. The method also includes determining a degree of similarity of wireless communication network visibility based on a comparison of the list of wireless communication networks indicated as being detected by the candidate mobile device with the lists of the wireless communication networks detected by each mobile device of the test group of mobile devices. In response to the degree of similarity of wireless communication network visibility failing to exceed a predetermined threshold, the method includes determining that the candidate mobile device is spoofing its location.

Embodiments of the present invention are directed to a system for using wireless communication networks to detect GPS spoofing. The system includes a memory having computer readable computer instructions, and a processor for executing the computer readable instructions. The computer readable instructions include instructions for receiving, from each mobile device of a plurality of mobile devices, location data of the mobile device. The computer readable instructions also include instructions for receiving, from each mobile device of the plurality of mobile devices, a list of wireless communication networks indicated as being detected by the mobile device. The computer readable instructions also include instructions for selecting, from the plurality of mobile devices, a test group of mobile devices. The test group of mobile devices can include a group of at least two mobile devices that are located within a predetermined proximity to a candidate mobile device of the plurality of mobile devices. The computer readable instructions also include instructions for determining a degree of similarity of wireless communication network visibility based on a comparison of the list of wireless communication networks indicated as being detected by the candidate mobile device with the lists of the wireless communication networks detected by each mobile device of the test group of mobile devices. In response to the degree of similarity of wireless communication network visibility failing to exceed a predetermined threshold, the computer readable instructions include instructions for determining that the candidate mobile device is spoofing its location.

Embodiments of the invention are directed to a computer program product for using wireless communication networks to detect GPS spoofing, the computer program product comprising a computer readable storage medium having program instructions embodied therewith. The computer readable storage medium is not a transitory signal per se. The program instructions are executable by a processor to cause the processor to perform a method. A non-limiting example of the method includes receiving, from each mobile device of a plurality of mobile devices, location data of the mobile device. The method also includes receiving, from each mobile device of the plurality of mobile devices, a list of wireless communication networks indicated as being detected by the mobile device. The method also includes selecting, from the plurality of mobile devices, a test group of mobile devices. The test group of mobile devices can include a group of at least two mobile devices that are located within a predetermined proximity to a candidate mobile device of the plurality of mobile devices. The method also includes determining a degree of similarity of wireless communication network visibility based on a comparison of the list of wireless communication networks indicated as being detected by the candidate mobile device with the lists of the wireless communication networks detected by each mobile device of the test group of mobile devices. In response to the degree of similarity of wireless communication network visibility failing to exceed a predetermined threshold, the method includes determining that the candidate mobile device is spoofing its location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a flow diagram of a method for using wireless communication networks to detect GPS spoofing according to one or more embodiments of the invention; and FIG. 6 depicts a flow diagram of a method for using wireless communication networks to identify a GPS spoofing device according to one or more embodiments of the invention.

Figure 1:
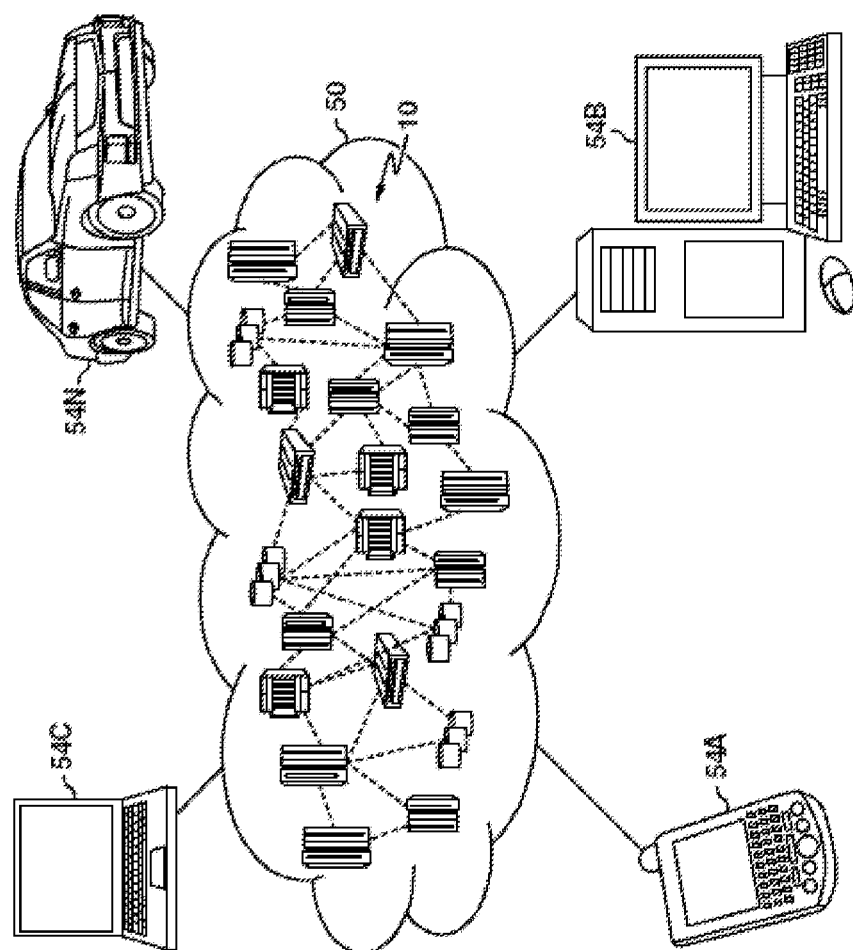
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
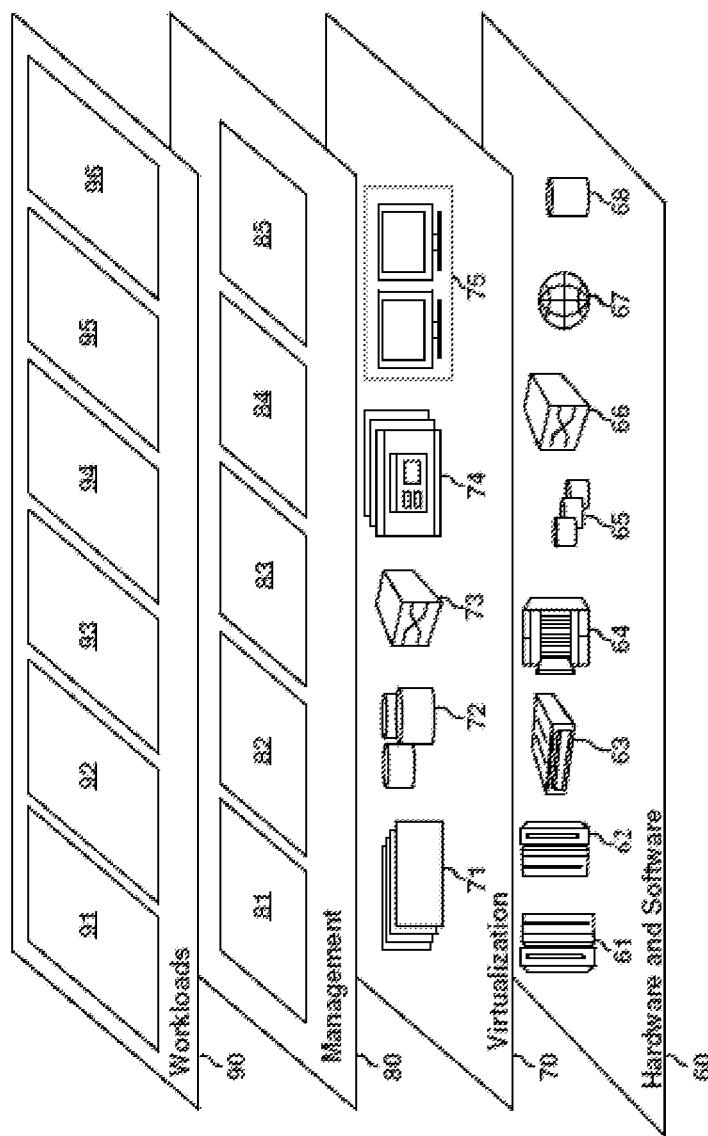
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and using wireless communication networks to detect GPS spoofing 96.

Figure 3:
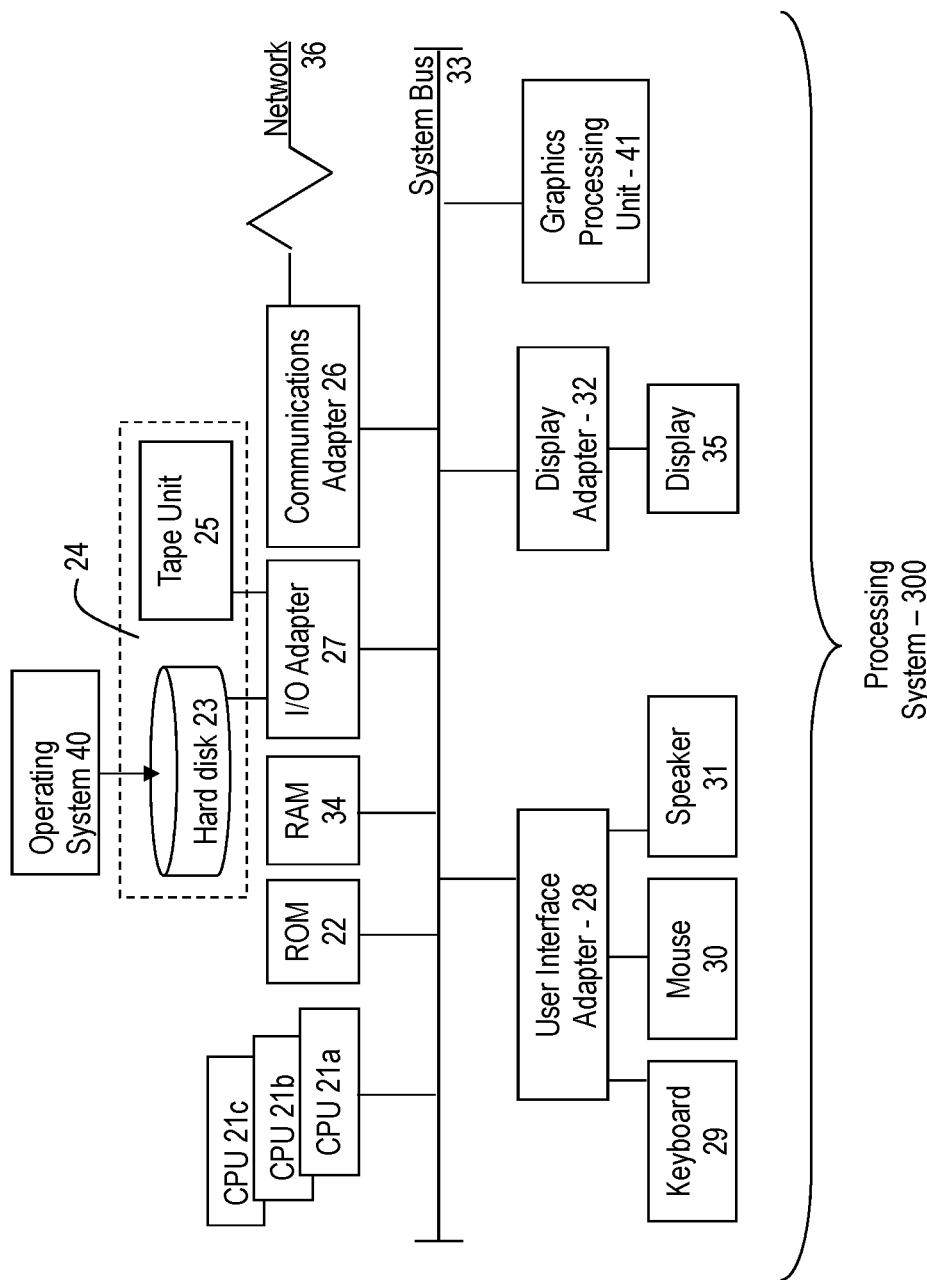
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for using wireless communication networks to detect GPS spoofing is provided. In exemplary embodiments, the system receives location data (e.g., GPS data) from a plurality of mobile devices, such as smartphones and also receives a list of wireless communication networks detected by each of the plurality of mobile devices. For example, as will appreciated by those of skill in the art, each of the mobile devices may passively detect one or more wireless networks or wireless access points, such as Wi-Fi networks, WiMAX networks, cellular networks, ad hoc wireless networks, BLUETOOTH™ networks or any other type of wireless communication network currently known or developed in the future. Each list of wireless communication networks will contain information about each respective wireless network, such as for example, the name of the network, the SSID of the network, the MAC address of the wireless access point, any broadcasted meta data that uniquely describes a network or other such identifying information. The system can then compare the wireless networks detected by each device to the wireless networks detected by other nearby devices to determine whether a particular mobile device is spoofing its GPS location. For example, if a group of four mobile devices are near each other and three of the mobile devices detect Wi-Fi networks A, B, and C and the fourth mobile device detects Wi-Fi networks X, Y, and Z, the system may determine that the fourth mobile device is spoofing its GPS data and is not actually physically present in the vicinity of the other three mobile devices as its GPS location data would otherwise suggest. Following a determination that a mobile device is spoofing its location data, the system can then take various actions, such as for example, preventing the mobile device from receiving a requested location-based service. The techniques for identifying location spoofing by mobile devices presented herein are effective because there is no widely known way to replicate available wireless networks at any given geographical location. The system does not rely on knowing the geographical location of any transmitter, nor does it require knowledge of the physical characteristics of any radio signal or require any complex processing. Accordingly, the system provides a technique for identifying mobile devices that have spoofed locations that are relatively low-cost to implement, effective, and that can be deployable to application developers. For example, a mobile application installed on a mobile device can use an API that allows for the transmission of mobile device location data and detected communication networks to a central server for comparison.

Figure 4:
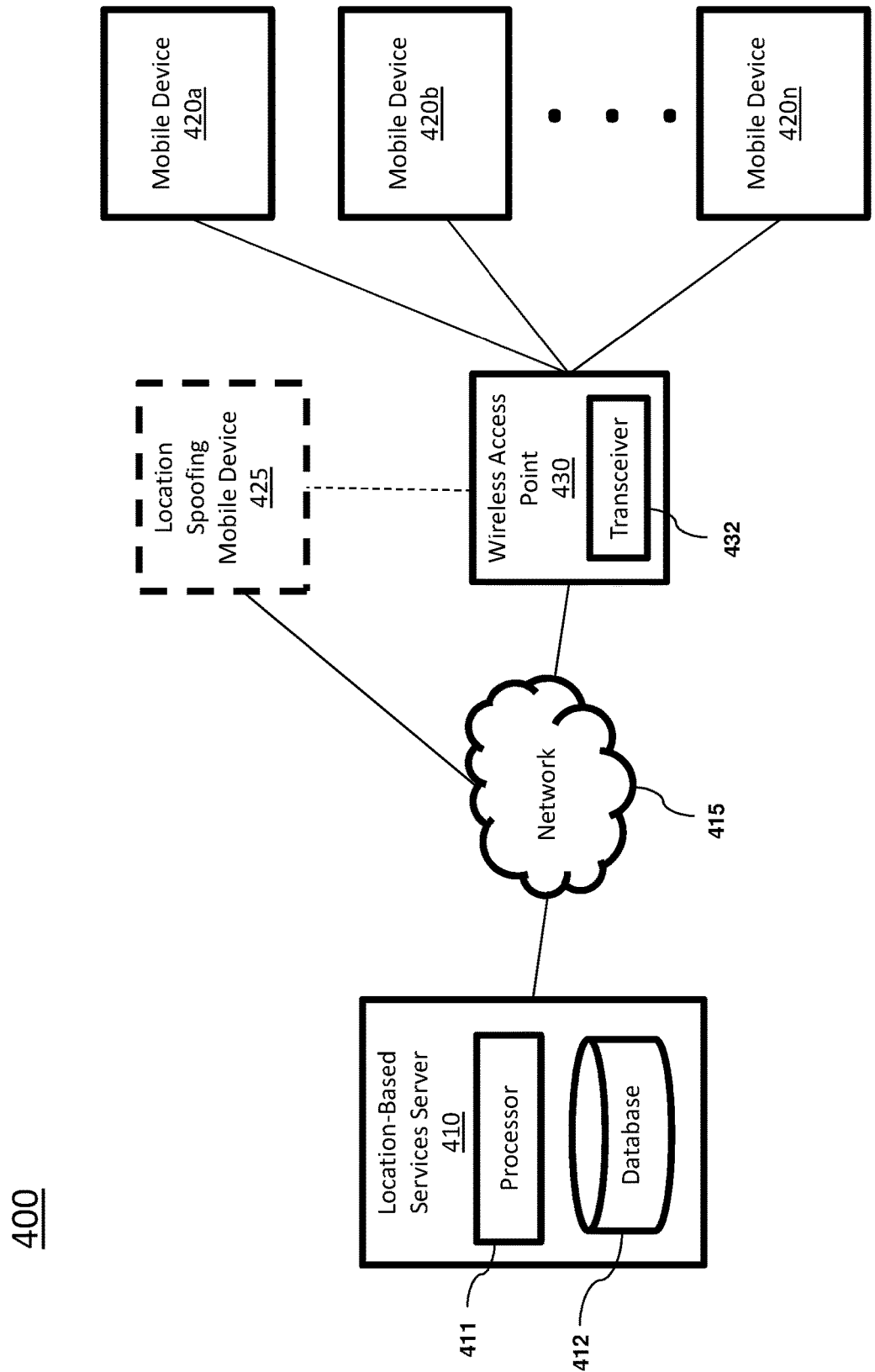
FIG. 4 depicts a system upon which using wireless communication networks to detect GPS spoofing may be implemented according to one or more embodiments of the present invention.

Turning now to FIG. 4, a system 400 for using wireless communication networks to detect GPS spoofing is provided will now be described in accordance with an embodiment. The system 400 includes a location-based services server 410 in communication with one or more wireless access points 430 via communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The one or more wireless access points 430 are in communication with one or more mobile devices 420*a-n* based on the proximity of each mobile device 420*a-n* to a respective wireless access point 430. The location-based services server 410 can also be in communication with a location spoofing mobile device 425 that may provide location data (e.g., GPS data) to the location-based services server 410 that creates the impression that it is nearby to one or more of mobile devices 420*a-n*.

In some embodiments, a location-based services server 410 can include a processor 411 and a database 412. As will be described in further detail below with respect to FIGS. 5 and 6, location-based services server 410 can receive location data (e.g., GPS data) and a list of detected wireless communication networks from each of a plurality of mobile devices 420*a-n* and a location spoofing mobile device 425. The location-based services server 410 can be configured to determine that a location spoofing mobile device 425 is spoofing its location data by comparing its list of detected wireless communication networks with the lists of detected wireless communication networks of two or more mobile device 420*a-n* that are nearby to the location spoofing mobile device 425, according to the location data provided by each device. In some embodiments, the location-based services server 410 can receive location data and/or lists of detected wireless communication networks intermittently, in response to changes to the networks detected by the respective devices, or in response to a request sent to a device by the location-based services server 410. For example, in some embodiments, the location-based services server 410 may request the most up-to-date lists of detected wireless networks from one or more mobile devices 420*a-n* immediately prior to determining if a location spoofing mobile device 425 is spoofing its location. In some embodiments, the location-based services server 410 can be configured to provide location-based services to mobile devices 420*a-n*. According to some embodiments, a location-based services server 410 may be configured to facilitate purchases from merchants and/or provide discounts on purchases based on the location of the user. For example, a local store may be offering a sale on a particular clearance item, but may only want to offer the discount to nearby users to attract the users to enter the store. In some embodiments, the location-based services server 410 may be configured to administer a game with location-based features, such as an augmented reality game that is played by users of mobile devices 420*a-n*. The location-based services server 410 may be configured to provide game functionalities to the users based on their location, such as for example, awarding game items, rewards, and/or enabling interactions with other nearby users. According to some embodiments, the location-based services server 410 may be configured to prevent a location spoofing mobile device 425 that has been determined to be spoofing its location data from accessing or receiving one more location-based services. It should be understood that the location-based services described above are merely exemplary and any conceivable location-based service may be administered and/or restricted from use by the location-based services server 410 in accordance with embodiments described herein.

According to some embodiments, a wireless access point 430 includes a transceiver 432 that allows the wireless access point to wirelessly communicate with one or more mobile devices 420*a-n*. According to various embodiments, a wireless access point 430 can include one or more of a wireless router, a Wi-Fi router, a wireless base station, a cellular tower, an ad-hoc wireless node, a mobile device 420*a* acting as a wireless access point, or another other such suitable device. As shown in FIG. 4, a location spoofing mobile device 425 that is spoofing its location will likely not be in wireless communication with wireless access point 430, as it will likely be greatly out of range of the wireless access point's 430 wireless signal. In other words, because the location spoofing mobile device 425 will generally be out of range of the wireless access point 430, it will not be capable of wirelessly detecting the signal of the wireless access point 430. Thus the wireless access point 430 and its associated metadata will generally not be included in the list of detected wireless communication networks supplied to the location-based services server 410 by the location spoofing mobile device 425.

In exemplary embodiments, mobile devices 420*a-n* can include, but are not limited to, a smartphone, a wearable device such as a smartwatch, an augmented reality headset, a tablet, a computer system such as the one shown in FIG. 3, or any other suitable mobile electronic device. In some embodiments, each of the mobile devices 420 includes one or more of a processor, one or more sensors, a display, and a transceiver. The sensors can include one or more of an image capture device (e.g., digital camera) for obtaining images and/or videos, a microphone for obtaining audio recordings, and a location sensor for obtaining location data of the user device (e.g., GPS coordinates). Mobile devices 420*a-n* can include an input device, such as a keyboard (either physical or digital) for receiving user input text. Text can also be input orally via a microphone using voice recognition. In some embodiments, a display of a mobile device 420*a-n* is configured to display images and/or video. In some embodiments, the display can be a touchscreen that may be configured to detect tactile user inputs (e.g., typing, pressing, swiping, etc.). In some embodiments, mobile devices 420*a-n* may include hardware and software that allow a user to access a mobile application for receiving location-based services that can be provided by, for example a merchant or a game server (e.g., location-based services server 410). For example, mobile devices 420*a-n* can include a mobile application that allows a user to receive discounts on purchases, make purchases, collect virtual items (e.g., via an augmented reality system) and/or execute a functionality (e.g., a game functionality) based on the location of the mobile device 420*a*. For example, a mobile application for buying movie tickets may be configured to only allow a user to buy tickets if the user is within a predetermined proximity to the movie theater. A transceiver of each mobile device 420*a-n* can be configured to allow the mobile device 420 to wirelessly communicate with a wireless access point 430 (e.g., a wireless access point for a Wi-Fi network, a cellular network, etc.). As will be understood by those of skill in the art, based on their proximity to a various wireless access points 430 and the respective signal strengths of such wireless access points 430, mobile devices 420*a-n* can detect various wireless networks (e.g., Wi-Fi networks, cellular networks, etc.) and may receive metadata associated with such networks such as network names, identifying information, MAC addresses, and other such metadata that can be used to identify the network and/or wireless access point 430. According to some embodiments, mobile devices 420*a-n* can include software designed to aggregate such metadata from detected wireless networks into a list and transmit the list to the location-based services server 410. In some embodiments, a mobile device 420*a* can be configured to update and transmit the list of detected wireless networks intermittently (e.g., after a predetermined recurring time period) in response to a change to the list (e.g., a network is newly detected or dropped from detection), or upon receiving a request from the location-based server 410.

According to some embodiments, a location spoofing mobile device 425 can be of the same type of device as the mobile devices 420*a-n* described above, or may also be a stationary device, such as a desktop computer. As will be understood in the context of this disclosure, a location spoofing mobile device 425 can be a device that is configured to spoof its location data (e.g., GPS data) to provide a false impression that the device is physically located at a location that the location spoofing mobile device 425 is not really located at. For example, a location spoofing mobile device 425 may be physically present somewhere in Europe or Asia, but may provide spoofed location data to location-based services server 410 that falsely indicates that the device is a mobile device (e.g., similar to mobile device 420*a*) that is moving about, for example, Times Square in New York City. In some embodiments, the location spoofing mobile device 425 may include software applications, such as for example, mobile applications of merchants or location-based gaming software, that a user of the location spoofing mobile device 425 may attempt to use to unfairly or fraudulently gain access to location-based services or functionalities that the user is not entitled to, based on the spoofed location data of the location spoofing mobile device 425.

Turning now to FIG. 5, a flow diagram of a method 500 for using wireless communication networks to detect GPS spoofing in accordance with an embodiment is shown. In one or more embodiments of the present invention, the method 500 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing systems, such as the processing system 300 described hereinabove and illustrated in FIG. 3, or in some other type of computing or processing environment.

The method 500 begins at block 502 and includes receiving (e.g., by location-based services server 410), from each mobile device of a plurality of mobile devices (e.g., mobile devices 420*a-n* and location spoofing mobile device 425), location data of the mobile device. In some embodiments, location data may be GPS coordinates obtained from a GPS sensor of the mobile device. In some embodiments, location data may be represented by a radio signal delay of one or more cellular telephone towers to the mobile device, which may also be capable of being spoofed.

As shown at block 504, the method includes receiving (e.g., by location-based services server 410), from each mobile device of the plurality of mobile devices (e.g., mobile devices 420*a-n* and location spoofing mobile device 425), a list of wireless communication networks indicated as being detected by the mobile device. For example, as described previously above, each mobile device 420*a-n* can be configured to detect one or more nearby wireless communication networks (e.g., Wi-Fi networks, cellular networks, etc.) by detecting wireless signals sent by wireless access points 430 associated with the wireless networks and form a list of detected wireless communication networks and/or network metadata. According to some embodiments, the wireless communication networks can include one or more of Wi-Fi networks, cellular networks, WiMAX networks, ad hoc wireless networks, or any other wireless communication network that utilizes one or more wireless access points 430. In some embodiments, each wireless communication network of a list of wireless communication networks may be associated with one or more of a service set identifier (SSID), a name of the wireless communication network and a medium access control (MAC) address associated with a wireless access control point 430 of the wireless communication network.

As shown at block 506, the method includes selecting (e.g., by location-based services server 410), from the plurality of mobile devices, a test group of mobile devices. According to some embodiments, the test group of mobile devices can include a group of at least two mobile devices (e.g., mobile devices 420*a-n*) that are located within a predetermined proximity to a candidate mobile device (e.g., location spoofing mobile device 425) of the plurality of mobile devices. According to some embodiments, the predetermined proximity can be a predetermined distance from the candidate mobile device, based on the location data provided by the respective devices. For example, the predetermined proximity may represent a 100-meter radius around the location of the candidate mobile device (e.g., location spoofing mobile device 425) that is indicated by the location data received from the candidate mobile device. In some embodiments, the predetermined proximity can be a predetermined area encompassing the candidate mobile device (e.g., location spoofing mobile device 425), based on the location data provided by the candidate mobile device. For example, if the location data received from the candidate mobile device indicates that the candidate mobile device is positioned proximate an intersection of two streets in a city, the predetermined area may be an area covered by the four city blocks surrounding the intersection. According to some embodiments, the system may store a plurality of such predetermined areas defined by geo-fences and may determine which mobile devices 420*a-n* are disposed within a given geo-fenced area based on the location data received from the mobile devices 420*a-n*.

According to some embodiments, a test group of mobile devices may be selected to include one or more trusted mobile devices. A trusted mobile device may be a mobile device that is classified by the system as being a mobile device that transmits an authentic location to the system. According to some embodiments, a mobile device may be registered as a trusted mobile device by, for example, authenticating a trusted user or owner of the device or by other processes of verifying the location or trustworthiness of a mobile device. In some embodiments, when determining a degree of similarity of wireless communication network visibility (as described below) the system may give more weight to the data provided by a trusted mobile device.

In some embodiments, data from a trusted mobile device may override conflicting detected wireless network data from one or more mobile devices that are not trusted, which can prevent a group of multiple location spoofing mobile devices 425 from attempting to trick the system by all spoofing locations near to one another and substantially similar indications of detected wireless communication networks.

As shown at block 508, the method includes determining (e.g., by location-based services server 410) a degree of similarity of wireless communication network visibility based on a comparison of the list of wireless communication networks indicated as being detected by the candidate mobile device (e.g., location spoofing mobile device 425) with the lists of the wireless communication networks detected by each mobile device 420*a-n* of the test group of mobile devices. In some embodiments, the degree of similarity of wireless communication network visibility can represent a degree of overlap between the list of wireless communication networks provided by the candidate mobile device with each of the lists of wireless communication networks provided by each of the mobile devices 420*a-n* of the test group. For example, a test group may include mobile devices 1, 2, and 3, and mobile devices 1 and 2 may provide a list of wireless networks that includes networks A, B, and C, and mobile device 3 may provide a list of wireless networks that includes B, C and D. If the candidate mobile device (e.g., location spoofing mobile device 425) provides a list of wireless network communication networks it has indicated it has detected as including X, Y, and Z, it can be said that there is no overlap between the list provided by the candidate mobile device and the other devices. If the candidate mobile device provides a list of networks A, Y, and Z, it can be said that only network A overlaps with the lists provided by mobile devices 1 and 2, and that the list provided by candidate mobile device includes two networks (Y and Z) that have no overlap with any of the lists provided by mobile devices 1, 2 and 3 and that networks B, C, and D that are listed by mobile devices 1, 2 and 3 do not overlap with the list provided by the candidate mobile device, and therefore there is little overlap.

According to some embodiments, determining the degree of similarity of wireless communication network visibility may include, for each mobile device of the test group of mobile devices, determining the percentage or number of the wireless communication networks included in the list of wireless communication networks indicated as being detected by the candidate mobile device (e.g., location spoofing mobile device 425) that are included in the list of wireless communication networks indicated as being detected by the mobile device of the test group of mobile devices. In some embodiments, the method may include determining the percentage and/or a number of wireless networks included in each list provided by the test group that are the same as a wireless network provided in the list provided by the candidate mobile device. The method may include calculating a score based on the determined percentages or numbers of matching networks between the list provided by the candidate mobile device and the mobile devices 420*a-n* of the test group. In some embodiments, calculating a score based on the determined percentages and/or number of matching networks can include assigning a weight to each of the determined percentages and/or numbers of matching networks based on the proximity of each mobile device of the test group of mobile devices 420*a-n* to the purported location of the candidate mobile device (e.g., as indicated by the location data provided by the location spoofing mobile device 425) and calculating a weighted average based on the determined percentages and their assigned weights. According, in some embodiments, the system (e.g., location-based services server 410) may provide greater weight to the lists provided by mobile devices 420*b* that are closer to the purported location of the candidate mobile device, as it may be expected that there may naturally be less overlap in detected networks with mobile devices 420*a-n* that are further away from the candidate mobile device. It should be understood that in various embodiments, different comparisons, thresholds, scores, weight and/or other calculations may be used to determine the degree of similarity of the list of networks provided by the candidate mobile device to the lists provided by the test group of mobile devices 420*a-n*, and the foregoing description is merely exemplary.

As shown at block 510, the method includes, in response to the degree of similarity of wireless communication network visibility failing to exceed a predetermined threshold, determining (e.g., by location-based services server 410) that the candidate mobile device is spoofing its location. For example, a threshold may be that at least 80% of the networks in the list provided by candidate mobile device (e.g., location spoofing mobile device 425) must match networks in the lists provided by the test group of mobile devices 420*a-n*, and in a cases where, for example only 20% match, then the system will determine that the candidate mobile device is spoofing its location.

In some embodiments, the method may further include receiving a request from the candidate mobile device to receive a location-based service and based on the determination that the candidate mobile device is spoofing its location, preventing the candidate mobile device from receiving the location-based service. For example, the candidate mobile device may be running a mobile application for a merchant that allows users to make purchases of goods and/or services and the location-based service could be a discount on a purchase that is offered to users who are within a predetermined physical proximity to the store. In some embodiments, a location-based service may be a location-based item that can be collected in a game (e.g., an augmented reality game) or an interaction with another game player that is enabled based on the proximity to the other user. It should be understood that these are merely examples, and any benefit, information provided, and/or functionality that is offered or enabled via a mobile device 420*a* based on the location data of the mobile device 420*a* can be considered to be a location-based service.

Turning now to FIG. 6, a flow diagram of a method 600 for using wireless communication networks to identify a GPS spoofing device in accordance with an embodiment is shown. In one or more embodiments of the present invention, the method 600 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing systems, such as the processing system 300 described hereinabove and illustrated in FIG. 3, or in some other type of computing or processing environment.

The method 600 begins at block 602 and includes receiving (e.g., by location-based services server 410), from each mobile device of a plurality of mobile devices (e.g., mobile devices 420*a-n* and location spoofing mobile device 425), location data of the mobile device in a manner similar to that described above with respect to step 502.

As shown at block 604, the method includes receiving (e.g., by location-based services server 410), from each mobile device of the plurality of mobile devices (e.g., mobile devices 420*a-n* and location spoofing mobile device 425), a list of wireless communication networks indicated as being detected by the mobile device in a manner similar to that described above with respect to step 504.

As shown at block 606, the method includes selecting a test group of mobile devices (e.g., mobile devices 420*a-n* and location spoofing mobile device 425) from the plurality of mobile devices. The test group of mobile devices can include a group of at least three mobile devices that are located within a predetermined area, as indicated by the location data provided by the respective mobile devices. For example, the test group of mobile devices may all be located within a predetermined enclosed boundary. Alternatively, in some embodiments, the test group of mobile devices may all be located within a predetermined proximity (e.g., 100 meters) from a specified location or point (e.g., the location of a merchant). In some embodiments, if the test group of mobile devices may only include two devices if one device is known to be a trusted mobile device.

As shown at block 608, the method includes identifying, based on a comparison of the list of wireless communication networks indicated as being detected by each mobile device of the test group to one another, a plurality of degrees of similarity of wireless communication visibility. For example, if the test group is made up of mobile devices A, B, and C, then the system (e.g., location-based service server 410) can compare the list provided by A to the lists provided by B and C to determine a degree of similarity between the list of A to the collective lists of B and C, and then the system can similarly compare the list of B to the collective lists of A and C, and the list of C to the collective lists of A and B to generate respective degrees of similarity between each mobile device and the collective lists of the other mobile devices.

As shown in block 610, the method includes, responsive to a degree of similarity of wireless communication network visibility failing to exceed a predetermined threshold, determining that an associated mobile device is spoofing its location. For example, in the example of the previous paragraph, if the lists of A and C completely match but are completely different than the list of B, the system may determine that B has a 0% degree of similarity with A and C, while A has a 50% degree of similarity with B and C, and C has a 50% degree of similarity with A and B. If, for example, the predetermined threshold is 40%, the system (e.g., location-based services server 410) may determine that mobile device B is spoofing its location, and that mobile devices A and C are not. In some embodiments, the predetermined threshold can be based on the number of mobile devices that are included in the test group. For example, generally speaking, a higher number of mobile devices in the test group may result in a higher predetermined threshold because comparison to more devices should provide a greater confidence level. Further, in some embodiments, greater weight may be given to comparisons involving mobiles devices that are closer to one another (as indicated by the provided location data) and/or to comparisons to lists provided by trusted mobile devices. In response to determining that a mobile device is spoofing its location, the system (e.g., location-based services server 410) may designate the mobile device as not being authenticated and/or may prevent the mobile device from receiving location-based services as described otherwise herein.

In a case where the test group includes a trusted mobile device and only one other mobile device, then the system may only compare the list provided by the trusted mobile device to the list provided by the other mobile device, and in response to determining the degree of similarity between the two fails exceed a threshold (e.g., 80%), may determine that the other device is spoofing its location.

Additional processes may also be included. It should be understood that the processes depicted in FIGS. 5 and 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, from each mobile device of a plurality of mobile devices, location data of the mobile device;
   receiving, from each mobile device of the plurality of mobile devices, a list of wireless communication networks indicated as being detected by the mobile device;
   selecting, from the plurality of mobile devices, a test group of mobile devices, the test group of mobile devices comprising a group of at least two mobile devices that are located within a predetermined proximity to a candidate mobile device of the plurality of mobile devices as indicated by the received location data;
   determining, based on a comparison of the list of wireless communication networks indicated as being detected by the candidate mobile device with the lists of the wireless communication networks detected by each mobile device of the test group of mobile devices, a degree of similarity of wireless communication network visibility;
   responsive to the degree of similarity of wireless communication network visibility failing to exceed a predetermined threshold, determining that the candidate mobile device is spoofing its location;
   receiving a request from the candidate mobile device to receive a location-based service; and
   based on the determination that the candidate mobile device is spoofing its location, preventing the candidate mobile device from receiving the location-based service.

2. The computer-implemented method of claim 1, wherein the location data comprises GPS coordinates.

3. The computer-implemented method of claim 1, wherein the wireless communication networks comprise Wi-Fi networks.

4. The computer-implemented method of claim 1, wherein the wireless communication networks comprise cellular networks.

5. The computer-implemented method of claim 1, wherein the location-based service comprises a discount on a purchase.

6. The computer-implemented method of claim 1, wherein the predetermined proximity comprises one of:
   a predetermined distance from the candidate mobile device; and
   a predetermined area encompassing the candidate mobile device.

7. The computer-implemented method of claim 1, wherein for each wireless communication network of a list of wireless communication networks, the list includes one or more of:
   a service set identifier (SSID) of the wireless communication network; and
   a medium access control (MAC) address associated with a wireless access control point of the wireless communication network.

8. The computer-implemented method of claim 7, wherein determining the degree of similarity of wireless communication network visibility comprises:
   for each mobile device of the test group of mobile devices, determining a percentage of the wireless communication networks included in the list of wireless communication networks indicated as being detected by the candidate mobile device that are included in the list of wireless communication networks indicated as being detected by the mobile device of the test group of mobile devices; and
   calculating a score based on the determined percentages.

9. The computer-implemented method of claim 8, wherein calculating a score based on the determined percentages comprises:
   assigning a weight to each of the determined percentages based on a proximity of each mobile device of the test group of mobile devices to the candidate mobile device as indicated by the received location data; and
   calculating a weighted average based on the determined percentages and their assigned weights.

10. A system comprising:
    a processor communicatively coupled to a memory, the processor configured to:
    receive, from each mobile device of a plurality of mobile devices, location data of the mobile device;
    receive, from each mobile device of the plurality of mobile devices, a list of wireless communication networks indicated as being detected by the mobile device;
    select, from the plurality of mobile devices, a test group of mobile devices, the test group of mobile devices comprising a group of at least two mobile devices that are located within a predetermined proximity to a candidate mobile device of the plurality of mobile devices as indicated by the received location data;
    determine, based on a comparison of the list of wireless communication networks indicated as being detected by the candidate mobile device with the lists of the wireless communication networks detected by each mobile device of the test group of mobile devices, a degree of similarity of wireless communication network visibility;
    responsive to the degree of similarity of wireless communication network visibility failing to exceed a predetermined threshold, determine that the candidate mobile device is spoofing its location;
    receive a request from the candidate mobile device to receive a location-based service; and
    based on the determination that the candidate mobile device is spoofing its location, prevent the candidate mobile device from receiving the location-based service.

11. The system of claim 10, wherein the location data comprises GPS coordinates.

12. The system of claim 10, wherein the wireless communication networks comprise Wi-Fi networks.

13. The system of claim 10, wherein the predetermined proximity comprises one of:
- a predetermined distance from the candidate mobile device; and
- a predetermined area encompassing the candidate mobile device.

14. The system of claim 10, wherein determining the degree of similarity of wireless communication network visibility comprises:
- for each mobile device of the test group of mobile devices, determining a percentage of the wireless communication networks included in the list of wireless communication networks indicated as being detected by the candidate mobile device that are included in the list of wireless communication networks indicated as being detected by the mobile device of the test group of mobile devices; and
- calculating a score based on the determined percentages.

15. A computer program product comprising a non-transitory computer readable storage medium having program instructions embodied therewith the program instructions executable by a computer processor to cause the computer processor to perform a method comprising:
- receiving, from each mobile device of a plurality of mobile devices, location data of the mobile device;
- receiving, from each mobile device of the plurality of mobile devices, a list of wireless communication networks indicated as being detected by the mobile device;
- selecting, from the plurality of mobile devices, a test group of mobile devices, the test group of mobile devices comprising a group of at least two mobile devices that are located within a predetermined proximity to a candidate mobile device of the plurality of mobile devices as indicated by the received location data;
- determining, based on a comparison of the list of wireless communication networks indicated as being detected by the candidate mobile device with the lists of the wireless communication networks detected by each mobile device of the test group of mobile devices, a degree of similarity of wireless communication network visibility;
- responsive to the degree of similarity of wireless communication network visibility failing to exceed a predetermined threshold, determining that the candidate mobile device is spoofing its location;
- receiving a request from the candidate mobile device to receive a location-based service; and
- based on the determination that the candidate mobile device is spoofing its location, preventing the candidate mobile device from receiving the location-based service.

16. The computer program product of claim 15, wherein the location data comprises GPS coordinates.

17. The computer program product of claim 15, wherein the wireless communication networks comprise Wi-Fi networks.

* * * * *